United States Patent [19]
Wurzburger et al.

[11] Patent Number: 5,575,974
[45] Date of Patent: Nov. 19, 1996

[54] APPARATUS AND METHOD FOR AN ANODIC OXIDATION BIOCIDAL TREATMENT

[76] Inventors: Stephen R. Wurzburger, P.O. Box C, Goodyear's Bar, Calif. 95944; J. Michael Overton, 1127 Nickel La., Yuba City, Calif. 95991

[21] Appl. No.: 277,784

[22] Filed: Jul. 20, 1994

Related U.S. Application Data

[63] Continuation-in-part of Ser. No. 61,483, May 12, 1993, abandoned.

[51] Int. Cl.$^6$ ..................................................... A61L 2/02
[52] U.S. Cl. ........................... 422/22; 204/149; 210/243; 210/748
[58] Field of Search ............................. 422/22; 204/149; 210/243, 748

[56] References Cited

U.S. PATENT DOCUMENTS

| | | | |
|---|---|---|---|
| 3,936,364 | 2/1976 | Middle | 204/149 |
| 4,054,503 | 10/1977 | Higgins | 204/271 |
| 4,089,768 | 5/1978 | Fischer et al. | 204/228 |
| 4,131,526 | 12/1978 | Moeglich | 204/149 |
| 4,278,549 | 7/1981 | Abrams et al. | 210/696 |
| 4,525,253 | 6/1985 | Hayes et al. | 204/149 |
| 4,915,846 | 4/1990 | Thomas, Jr. et al. | 210/702 |
| 4,986,906 | 1/1991 | Dadisman | 210/169 |
| 5,114,571 | 5/1992 | Pier et al. | 204/149 |
| 5,122,277 | 6/1992 | Jones | 210/695 |
| 5,178,757 | 1/1993 | Corney | 210/695 |
| 5,221,471 | 6/1993 | Huntley | 210/695 |
| 5,230,807 | 7/1993 | Kozlowski, II | 210/696 |

FOREIGN PATENT DOCUMENTS 2471953  6/1981  France ................................. 210/696

*Primary Examiner*—Timothy M. McMahon
*Attorney, Agent, or Firm*—Robert S. Smith

[57] ABSTRACT

An apparatus for destroying bacterial pathogens including at least one pair of electrodes secured in a housing configured to constrain flow of water through the region between the electrodes. In one construction, the electrodes are supported in a tube with sides of each member of an electrode pair conforming to the inner surface of the tube and electrode surfaces form a slotted space through which the water passes. The electrodes and space between the electrodes are also subject to a magnetic field which reduces rate of deposition of calacerous deposits on the electrode surfaces thereby extending the period of time between required cleaning of the electrodes. The electrodes can be simple slabs or screens or both. The electrodes are preferably tin, titanium, brass, iron or stainless steel.

5 Claims, 4 Drawing Sheets

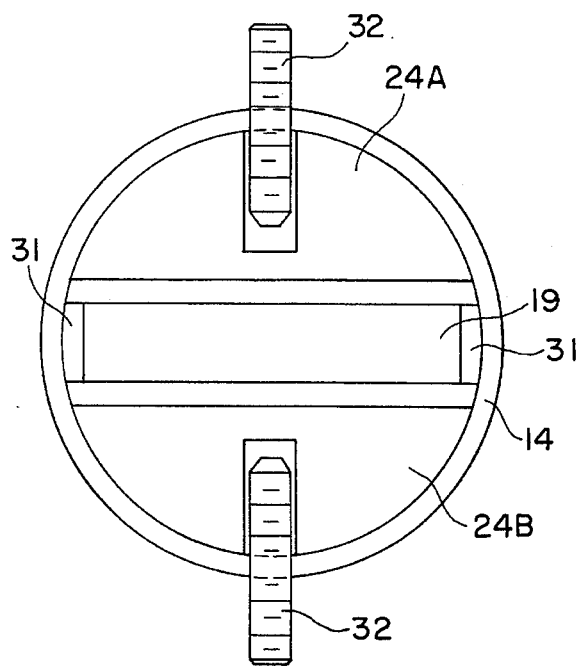
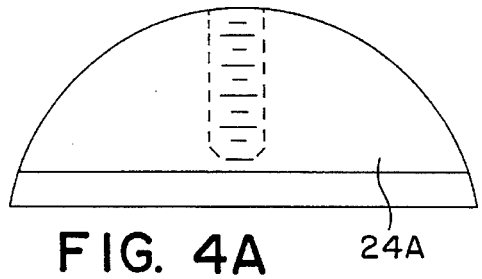
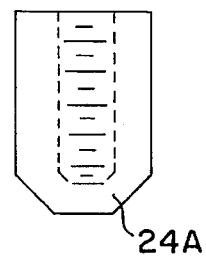
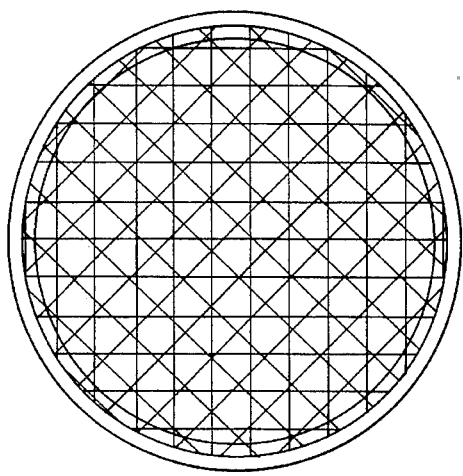
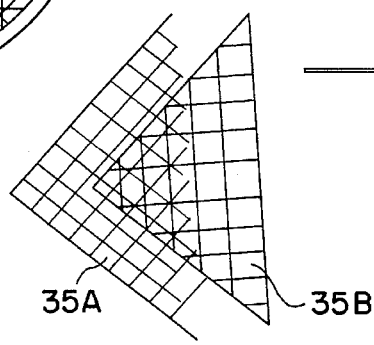
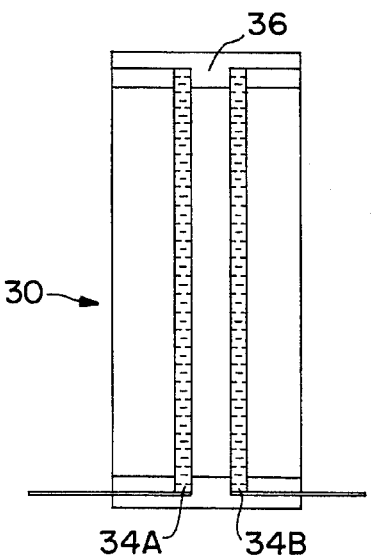
FIG. 4A
FIG. 4B
FIG. 4C
FIG. 5A
FIG. 5B
FIG. 5C

APPARATUS AND METHOD FOR AN ANODIC OXIDATION BIOCIDAL TREATMENT

CROSS REFERENCE TO OTHER APPLICATIONS

This application is a continuation-in-part to application Ser. No. 08/061,483 filed May 12, 1993 now abandoned for which priority is claimed.

BACKGROUND

1. Field of the Invention

This invention relates to sterilizing techniques and particularly to a method for killing bacteria in water.

2. Prior Art and Information Disclosure

The nation's water supplies have become chemically and biologically polluted. Ever increasing instances of unsafe and biologically contaminated water are causing public health problems and have brought into sharp focus the ever increasing need for clean safe pathogen free water for human and animal consumption. This need for clean water has led to a number of devices and apparatus for purifying, disinfecting and sterilizing.

Virtually all metropolitan areas in the United States are forced to use some sort of cleaning process to eliminate the suspended solids, pathogens, unpleasant odors and undesirable tastes. Water that is naturally purified and sterilized by the action of aeration, percolation and solar illumination are highly desirable, however, natural filtration through soils and sand is becoming less and less viable as increases in population cause tremendous and significant increases in water usage. More and more we are finding that even rural areas are being forced to deal with dangerously high levels of unwanted contaminants. As a matter of practice, virtually all surface water intended for animal or human contact or consumption must be disinfected, filtered, coagulated or otherwise pretreated for the removal of unwanted and harmful micro organisms (pathogens) such as Psuedomonis Aeruginosa, Giardia, the colifonn group and fecal treptococci.

For reasons of economy and technical simplicity, chlorination is a very common form of pathogenicide. In many cases the amount of chlorine required to achieve the disinfection is so excessive that the resulting odor and taste created by the chlorine itself is objectionable to the consumer. Pathogens are developing immunity to extremely high levels of chlorination and are unaffected by it.

U.S. Pat. No. 3,936,364 to Middle discloses electrolytic introduction of silver ions into water for biocidal puposes. While the addition of silver ions in sufficient concentration required to disinfect water does not adversely affect taste, color or odor of water, the residence times to acheive adequate disinfection may be quite long and therefore not practical. The public health services view a concentration on excess of 0.050 mg/l as grounds for rejection of treatment systems utilizing silver.

A number of apparatus have been disclosed for treating water for removal of metal ions.

U.S. Pat. No. 4,054,503 to Higgins discloses a portable unit including a cathode and anode for removing precious metal from solutions with an arrangement to prevent unauthorized removal of the deposited metal.

U.S. Pat. No. 4,089,768 to Fischer et al discloses a battery operated purification system which operates to purify water only when the voltage applied between electrodes exceeds a battery supply voltage.

Over sufficiently long periods, the anodic units currently embodied in the prior art manifest a major problem, i.e., the electrodes become calcified (calcareous deposits thereon) and biofouled. This biofouling and calcification renders the units ineffective and allow harmful pathogens to go untreated through the unit. In such units, removal of the calcification and biofouling requires disassembly, cleaning and or replacement of the electrodes on a frequent periodic basis.

THE INVENTION

OBJECTS:

It is an object of this invention to provide an apparatus and method for treating water so as to render the water pathogen free for animal or human contact and consumption.

It is another object that the treatment be effective for water from a wide variety of sources.

It is another object that the apparatus be operative for long periods of time compared to devices of the prior art.

SUMMARY

This invention is directed toward an apparatus including sets of electrodes which impose an electric field in a stream of water to kill bacteria. More than one set of electrodes are arranged such as to provide the most effective flow pattern. The electrodes are disposed in a magnetic field having a unique pattern and sufficient intensity to prevent formation of calcareous deposits on the electrodes. The electrodes are preferably made from a group of metals including iron, titanium, tin, brass and stainless steel.

An important feature of the invention is the structure of the electrodes positioned in the conduit in which at least one of the electrodes is a screen and positioning seals are provided such that all of the water passing through the conduit passes through the screen. The advantage of this arrangement is that, for a given applied voltage between electrodes, the distance between electrodes can be reduced to provide a very large field while the imposition of the screen in the current of water does not impede the flow of current such as occurs with solid electrodes.

DRAWINGS

FIG. 4 A, 4B and 4C show details of the plate electrodes.

FIG. 5A and 5B shows details of the screen electrodes.

FIG. 5C shows screen electrodes having a conical form.

Figure 6:
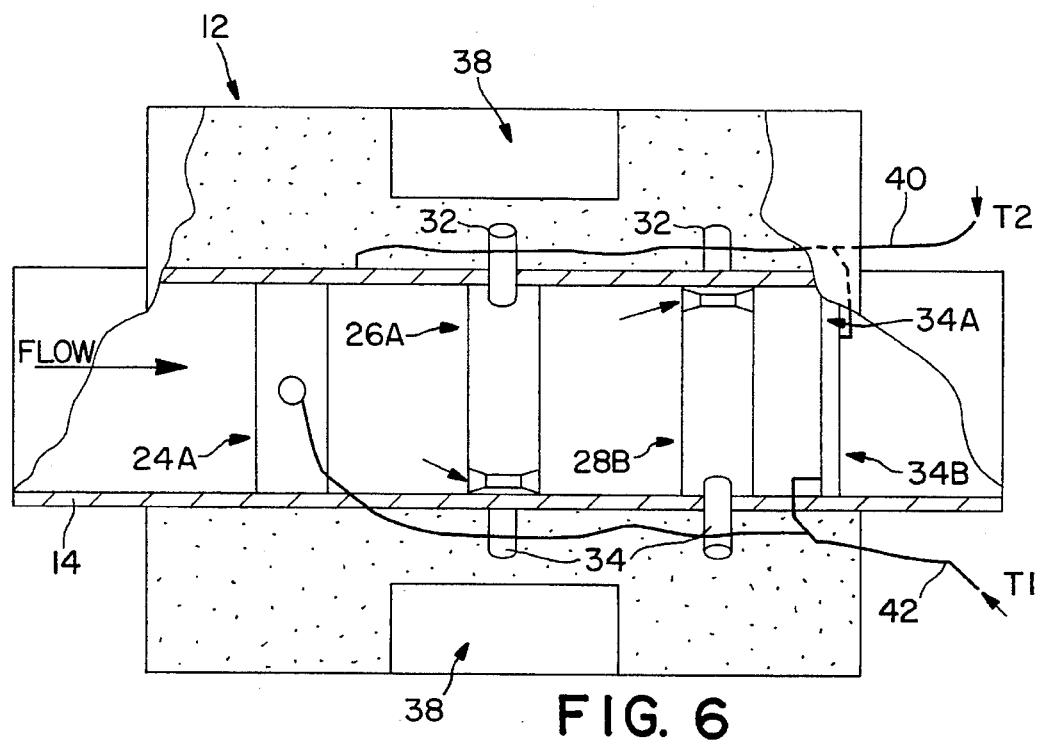

FIG. 6 shows the wiring of the electrodes.

Figure 1:
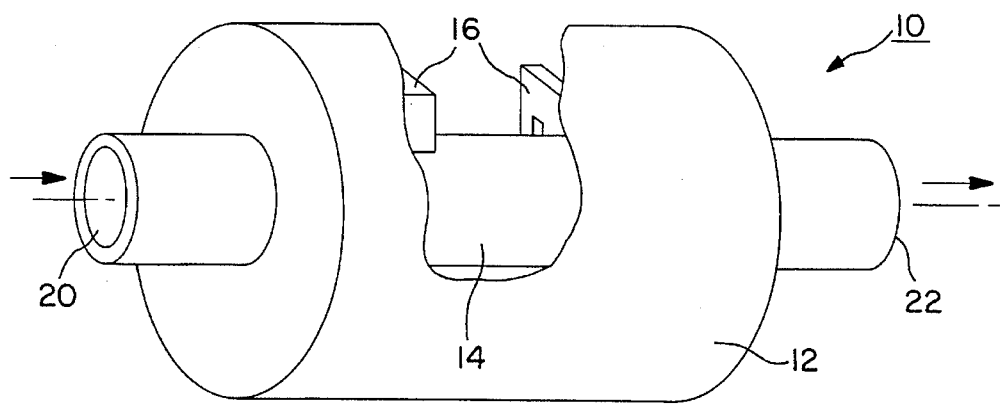
FIG. 1 is a perspective view of a biocidal treatment apparatus in accordance with the invention.
Figure 7:
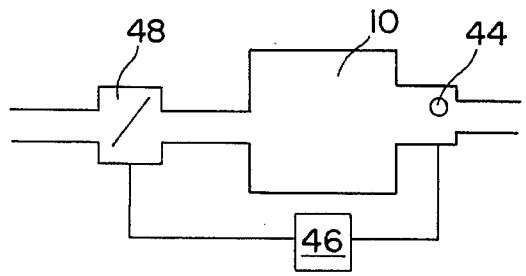

FIG. 7 shows the apparatus of FIG. 1 provided with an automatic flow shutoff.

Figure 8A:
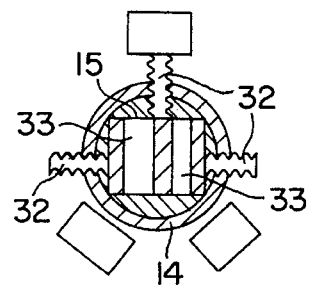
Figure 8B:
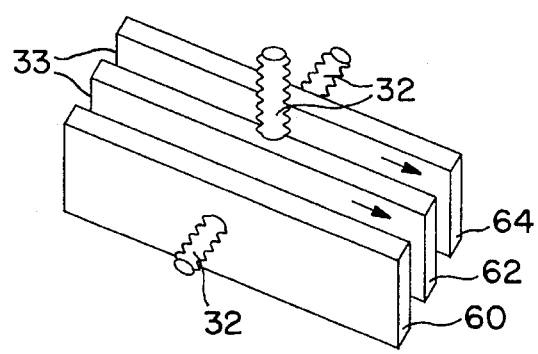

FIGS. 8A and 8B show another arrangement of electrodes for treating water in accordance with the invention.

Figure 9:
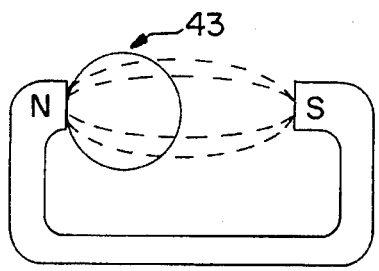

FIG. 9 is a prior art drawing illustrating a converging magnetic field.

Figure 10:
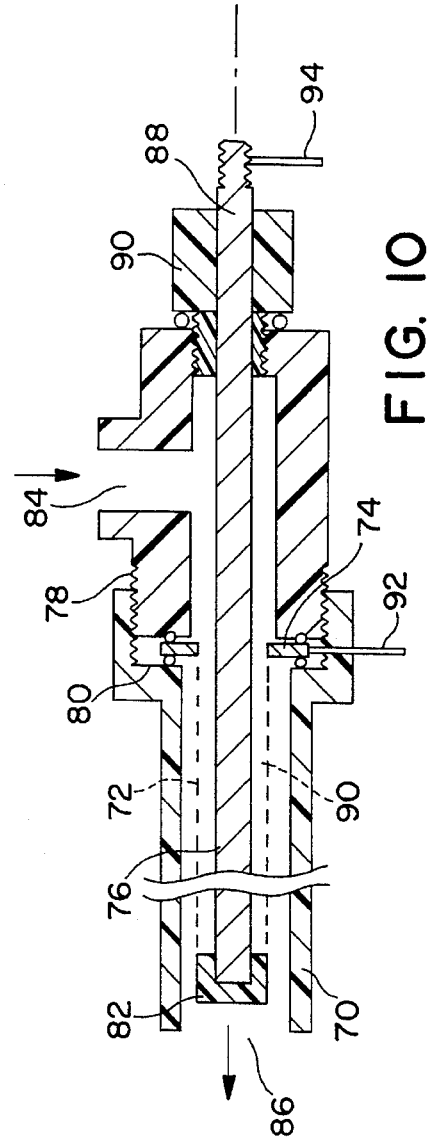

FIG. 10 is an exploded perspective view of a device with cylindrical electrode.

Figure 11:
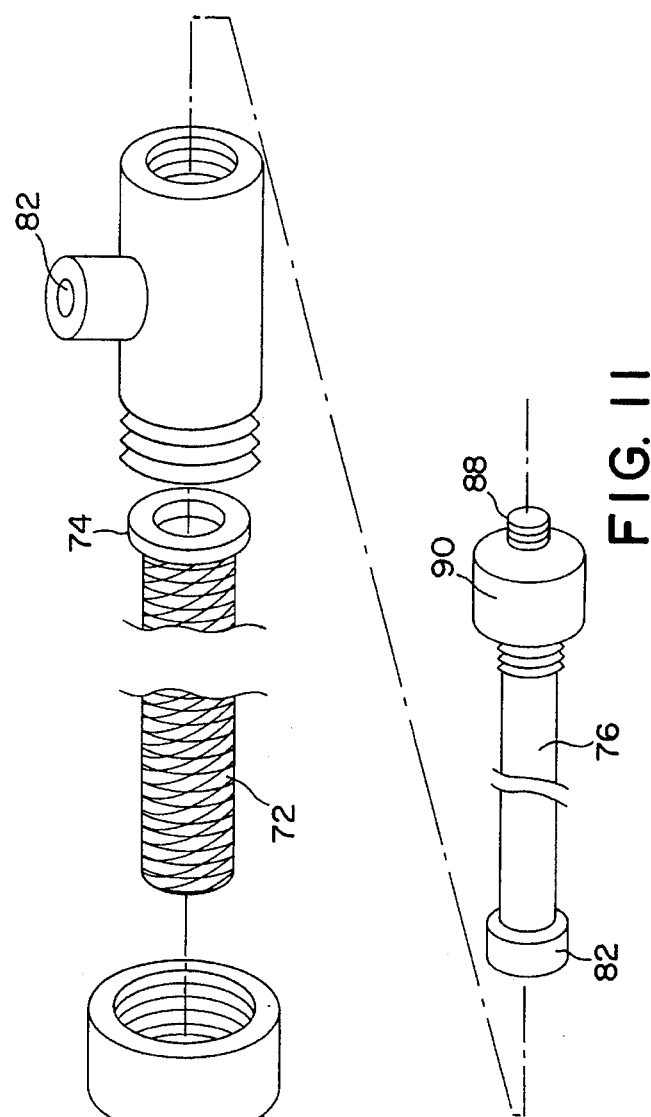

FIG. 11 is a sectional assembly view of the device of FIG. 10.

Figure 12:
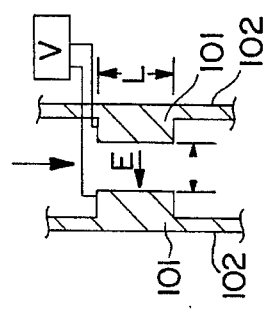

FIG. 12 illustrates the field generated and restriction of flow encountered with solid electrodes.

Figure 13:
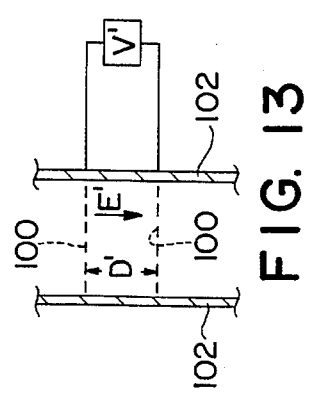

FIG. 13 illustrates the advantages of the screen electrodes.

DESCRIPTION OF THE BEST MODE

Turning now to a discussion of the drawings, FIG. 1 is a perspective assembly view of the anodic oxidation apparatus for biocidial treatment showing the outer housing 12 partially cut away to reveal the inner flow tube 14 and two magnet assemblies 16, straddling the electrode housing 14. Flow tube 14 is a polymer tube such as polyethylene, polypropylene, ABS, etc. Water to be treated flows into inlet 20 and treated water flows out of outlet 22.

Figure 2:
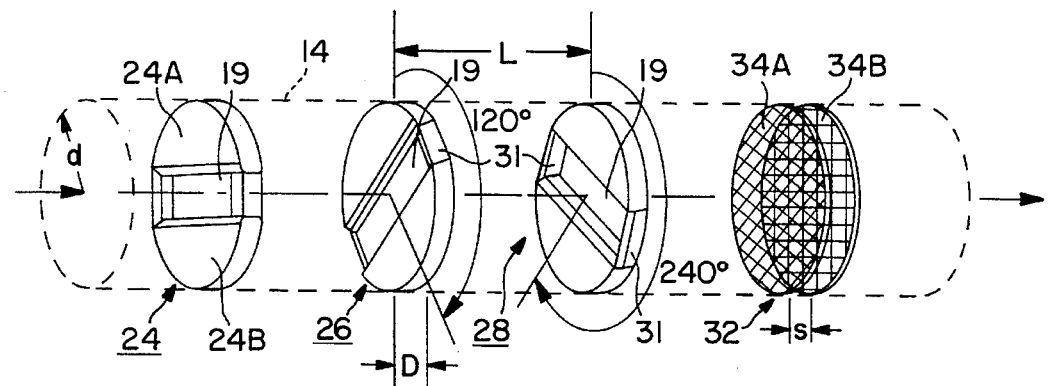
FIG. 2 is a perspective view of the electrode assembly.

FIG. 2 shows the four sets of electrodes inside flowtube 14. Flowtube 14 is shown in phantom in FIG. 2. Sets 24, 26 and 28 are identical except that each is oriented 120 degrees with respect to the other two as indicated in FIG. 2.

FIG. 4 shows details of an electrode such as make up the sets 24, 26 and 28. FIG. 4A is a plan view and FIG. 4B is an end view of one of the electrodes 24A. FIG. 4C shows two electrodes 24A and B secured opposite one another and secured to electrode housing 14 by stainless steel studs 32. Studs 32 also serve as terminals for applying an electric field between each pair of electrodes.

Figure 3B:
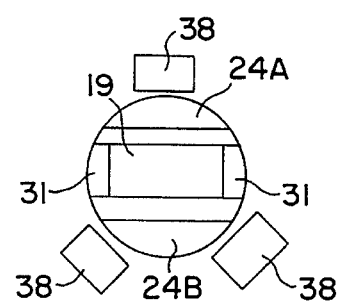
FIG. 3A and 3B illustrates the arrangement of magnets around the electrodes.

FIG. 2, 3B and 4C show diverters 31 placed between neighboring ends of the electrodes 24, 26, 28 which deflect the flow of water between the electrodes away from the interior wall of the electroded housing thereby ensuring that no water passing between the electrodes escapes the full intensity of the field between the more central section of the electrode assembly.

FIG. 5 A is a plan view and FIG. 5B is a side view of electrode set 30 (FIG. 2). FIG. 5B shows each electrode 34A and 34B to be two circular screens parallel to and spaced from one another by abutting against shoulders in a collar 36 that fits in the flow tube 14.

FIG. 5C shows screen electrodes 35A and B having a conical shape which are most effective for pipe diameters greater than four inches.

Figure 3A:
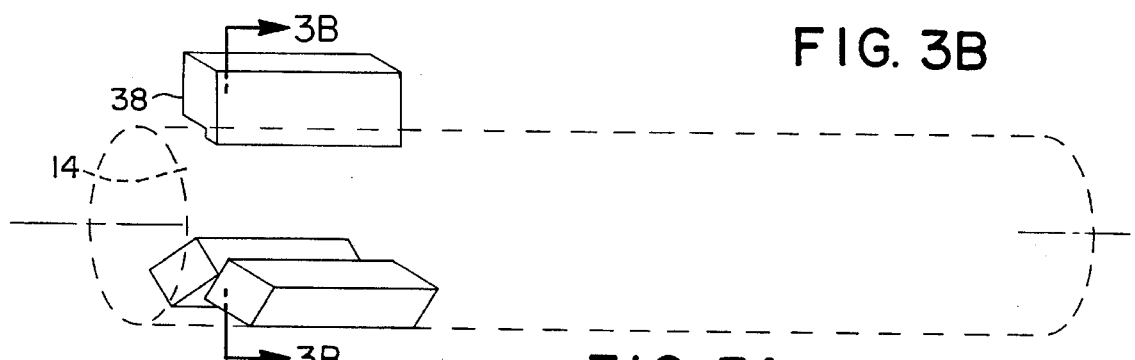

FIG. 3A shows three magnets 38 arranged around the flow tube 14. FIG. 3B is a sectional view taken along line of sight 3B in FIG. 3A showing the arrangement of the three magnets 38 of each set in relation to the adjacent electrodes 24 A and B.

Preferably, the magnetic field is a north homopolar field. For the purposes of this specification a north homopolar field is understood to mean a magnetic field in a region in which the magnetic field converges toward the north pole such that the magnetic flux lines are "compressed" as one moves in the direction toward the north pole. A north homopolar field is illustrated in FIG. 9, which shows a magnet having a north pole and a south pole with flux lines (represented by the dashed lines) diverging from both the north pole and the south pole. According to the terminology of this specification, a north homopolar field lies within circle 43.

Referring to FIG. 2, the orientation at 120 of the slot of one electrode set (24, 26, 28) with respect to the slot 19 of its neighboring electrode set as well as orientation at 45 of screen electrode 34A with respect to electrode screen 34B are important design features of the invention in introducing turbulence into the flow pattern as the water flows through the fields thereby ensuring thorough treatment of the water.

FIG. 6 is a plan cutaway view showing the electrical connections to the electrodes by positive lead 40 and negative lead 42 connected to a D.C. power supply (not shown in FIG. 6). at terminals T1 and T2.

FIG. 7 is an electrical schematic diagram showing the presence of a flow sensor 44 downstream from the treatment apparatus 10 and is connected to control circuit 46 such that when flow through the treatment apparatus drops below a critical value, the power shuts off. This feature enables use of the device in situations where the flow of water is intermittently interrupted so that, when the water is not flowing (such as in domestic use) power is conserved. The apparatus is also provided with an automatic shutoff valve 48 which stops flow of water through the system in the event of a power failure.

FIGS. 8 A is a sectional view of another construction in accordance with the invention. showing three electrodes, 60, 62 and 64, each of which is a rectangular slab arranged parallel to one another as shown in the perspective view FIG. 8B. Electrical connection to each electrode is made by studs 32. The array of electrodes 60, 62, 64 is encased in epoxy and positioned on flow tube 14. Magnets 38 (five are shown) are arranged around the flow tube 14.)

Water flows through spaces between the electrodes. The central electrode 62 is maintained at a positive electrical potential with respect to the outer electrodes 60 and 64 generating an electric field in the spaces 33 so that the water flowing through the spaces 33 is subject to an electric field and a magnetic field.

The apparatus was run for a period of fifty hours with the magnet assemblies in position and fifty hours with the magnets removed from the apparatus. A substantial amount of calcareous deposit collected in the case where there were no magnets whereas an insignificant deposit accumulated when the magnets were positioned in the apparatus.

EXAMPLE

Olivehurst Public Utilities District experienced a problem with the contamination of a subdivision by *Pseudomonis aerugnosa*. Samples were taken to verify the magnitude of contamination. The initial samples exhibited a count of 1600 colonies per 100 ml and a standard plate count of 12,000 for all bacterial species. The water sample were treated using the biocidal apparatus illustrated in FIG. 2 in which the diameter "d" of the flow tube was 2.6 inches, the thickness "D" of each electrode (60, 62, 64) was ⅞ inches, the distance between electrodes "L" was 2 inches, and the distance between the two electrode screens "s" was 0.25 inches. At a flow rate of 2.5 gal. per min., the following results were obtained.:

| Voltage (D. C.) | # of colonies per 100 ml | total plate count |
| --- | --- | --- |
| 0 | 1600 | 12,000 |
| 45 | 13 | 68 |
| 75 | 2 | 71 |
| 100 | 50 | 83 |

Starting # colonies: 1600 per ml.
Starting total plate count 12,000

In another test, a total of substantially 200,000 *Giardia lamblia* cysts were spiked into twenty gal. of tap water and treated using the apparatus shown in FIG. 6 operated at 75 volts. Test results shows that 289 cysts were found intact by the state certified laboratory, BioVir.

An average of 20% recovery is usually seen in the process of collecting cysts in the test, i.e., about 20% of the actual population of cysts are seen under the microscope. Therefore, it is estimated that approximately 1,445 cysts should be present after the treatment. It may then be concluded that 0.72% of the initial Giardia was not killed. According to the law, water dispensed to the public must have 99.9% of *Giardia lambia* destroyed in the water. The tests of this invention recited above indicate that 99.3% were destroyed.

Another embodiment of the invention featuring a screen electrode is illustrated in the sectional view, FIG. 10 and the exploded perspective view, FIG. 11. A cylindrical screen electrode 72 is positioned inside an outer conduit 70 by a flange 74 on electrode 72 clamped between a shoulder 80 inside conduit 70 and a compression fitting 78 screwed onto conduit 70. A cylindrical electrode 76 is positioned inside screen electrode 72. A spacer seal 82 closes the opening at the end between the screen electrode 72 and the inner electrode 76. Another end 88 of electrode 76 is mounted in fitting 90 which screws into compression fitting 78 so that all of the fluid passing into or out of port 84 and out of or into port 86, respectively, passes through the screen electrode 72 and therefore through the region 86 between electrodes. An electrical potential applied between terminals 92 to the screen electrode and 94 to the inner electrode generates an electrical field in the region 90 so that all of the water passing in either direction through the conduit is subject to the electrical field and the same change in electrical potential between electrodes.

An important advantage in using screen electrodes such as shown in FIGS. 5A, 5B, 10, and 11 compared to the solid electrodes shown in FIG. 4A, B, C is that, with solid electrodes (4A,B,C), when the electrode spacing is made small in order to increase the field strength (for a given applied voltage), the region of current flow is restricted such as to reduce the flow of water. In comparison, a screen electrode can be positioned as close to the other electrode as required to attain a large field strength without sacrificing rate of current flow between the electrodes. The construction of the electrodes shown in FIGS. 5A, B, C and FIGS. 10 and 11 provides that all of the water passes through the screen into the region between the electrodes and the field from a moderate potential can be large by simply reducing the distance between the electrodes.

The advantages of the screen electrode are further illustrated by comparing the structure with screens 100 shown in FIG. 13 with the structure with solid electrodes 101 shown in FIG. 12. The outer walls 102 of the conduit are shown and it may be assumed that the impedance to flow from the conduit is negligble because of the relatively large cross sectional area of the conduit. However, the presence of the solid electrodes 101 as shown in FIG. 12 introduces an impedance to flow that is proportional to L/D. The field imposed between the electrodes is V/D Therefore, in the case of FIG. 12, the value of D must be a compromise between the value of field, E, that is required and tolerable restriction of current flow. The use of screen electrodes shown in FIG. 13 introduces no appreciable resistance to water flow. Therefore the value of D' may be selected to be as small as desired consistent with the limitations of the power supply, V', in order to obtain a large field E' without impeding flow of water.

The *Giardia lambia* cysts are generally very difficult to kill using solid electrodes. However, as shown by the results reported above, passage of water containing the cysts through screen electrodes into a region having a field of greater than 70 volts per cm killed greater than 99.9% of the *Giarda lambia*. This observation suggests that a field strength greater than 20 volts per cm is effective in reducing the density of the *Giarda lambia* population to a safe level.

In the foregoing paragraphs, an apparatus has been described which meet the objects of the invention. A major feature of the apparatus is an arrangement of electrodes defining a flow path of contaminated water between the electrodes to destroy bacteria and in the presence of a magnetic field that substantially reduces the formation of calcareous deposits on the electrodes. A number of designs applying this principle may occur after reading the specification and studying the drawings. I therefore wish to define the scope of this invention by the appended claims and in view of the specification if need be.

We claim:

1. A water treatment apparatus for destroying bacterial pathogens which comprises:

a conduit having a pair of ports adapted to enable water to flow into either one of said ports, through said conduit and out of said other port;

a pair of electrodes, each electrode of said pair of electrodes being a screen;

each electrode having a surface facing said surface of said other electrode and separated by a space from said surface of said other electrode;

each electrode adapted for connection to an electrical power supply such that an electric field and drop of electrical potential is generated between said surfaces of said electrodes in said space;

said electrodes arranged in operable combination with said conduit such that all of said water flowing through either one of said ports flows through one of said screens and through said space then through said second screen and then out of said other port thereby subjecting all of said water through said conduit to said electric field and drop of electrical potential when said electrodes are connected to said electric power supply.

2. A water treatment apparatus as in claim 1 wherein each said electrode of said pair of electrodes is a substantially flat screen, parallel to said other flat screen.

3. A water treatment apparatus as in claim 1 comprising:

a first electrode of said pair being a cylindrical screen;

a second electrode of said pair of electrodes being a screen and cylindrical and positioned inside said first electrode and substantially concentric with said first electrode;

a first end of said first electrode and a first end of said second electrode being substantially proximal to one of said pair of ports and a second end of said first electrode and a second end of said second electrode being substantially proximal to said second port of said conduit;

a first seal extending from said first end of said first electrode to said first end of said second electrode and a second seal extending from said second end of said first electrode to said conduit, said first and second seals arranged in operable combination with said first and second electrodes and said conduit such that all of water entering one of said ports flows through said first electrode through a region between said cylindrical electrodes and out through said other port whereby, when an electrical potential drop is applied between said electrodes such as to generate an electrical field between said electrodes, all portions of contaminated water passing through one port and out of said second port will be subjected to the same potential drop and electrical field.

4. An apparatus as in claim 1 wherein said first and second electrodes are fabricated from metal selected from a group of metals that consists of tin, titanium, iron, brass and stainless steel.

5. An apparatus as in claim 1 wherein said first and second electrodes are spaced from one another such that, when a selected voltage is applied between said electrodes, an electric field greater than seventy volts per centimeter is generated between said first and second electrodes whereby a substantial fraction of *Giarda lambia* present is killed that is present in water passed through said apparatus.

* * * * *